W. BOSS.
CLOTHES LINE REEL.
APPLICATION FILED APR. 14, 1911.
1,017,734.
Patented Feb. 20, 1912.
2 SHEETS—SHEET 1.
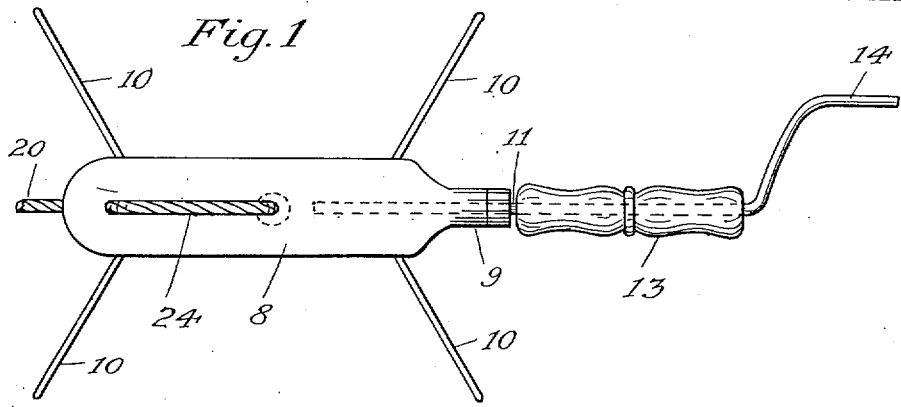
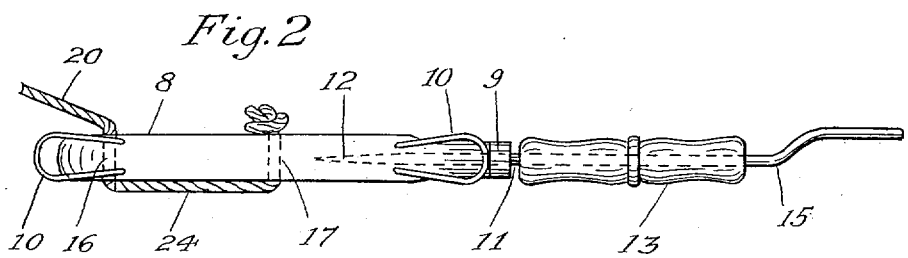
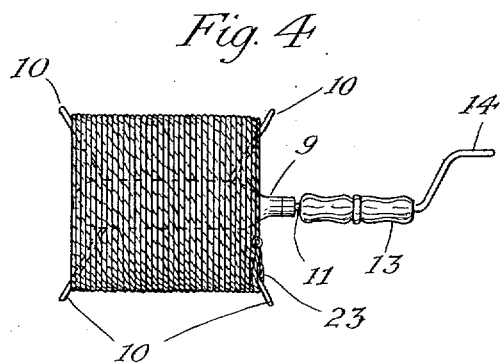
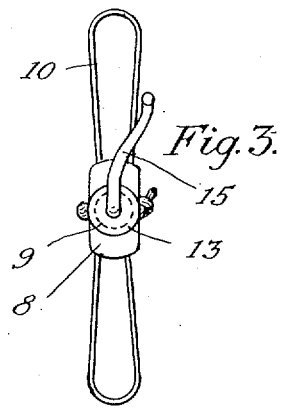
Witnesses:
Theo Lagaard
A. E. Hagen.
Inventor:
William Boss.
By F. A. Whiteley
his Attorney.

W. BOSS.
CLOTHES LINE REEL.
APPLICATION FILED APR. 14, 1911.
1,017,734.
Patented Feb. 20, 1912.
2 SHEETS—SHEET 2.
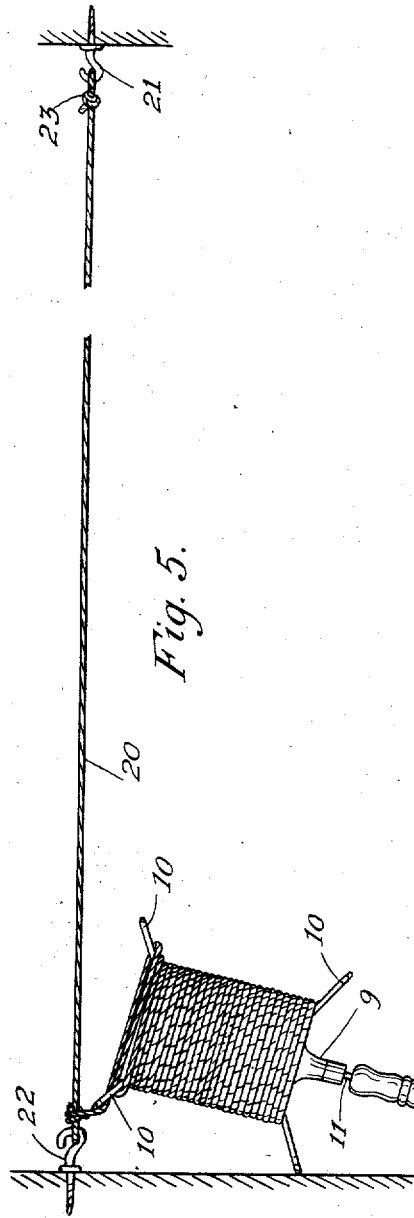
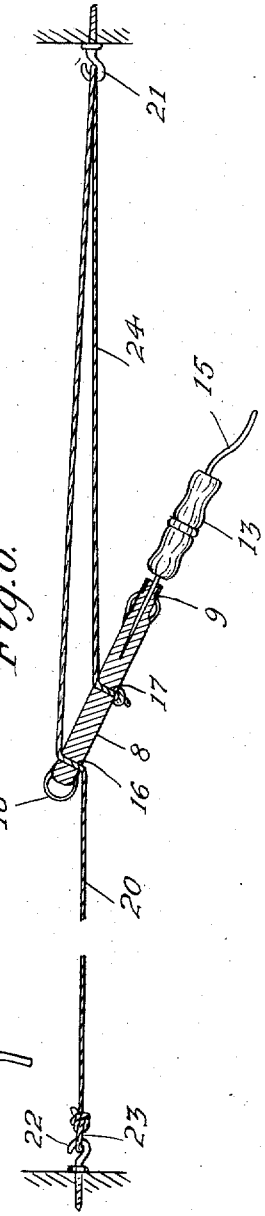
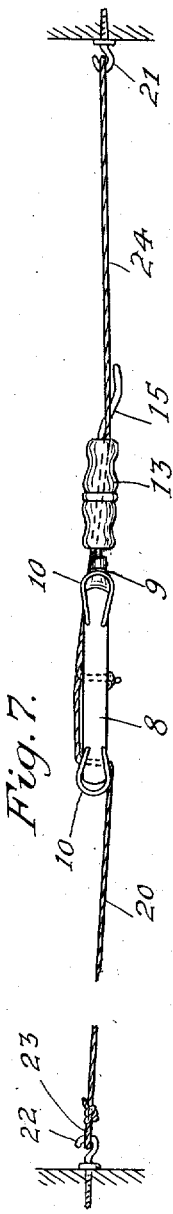
Witnesses:
Theo. Lagaard
G. C. Hagen.
Inventor:
William Boss:
By F. A. Whiteley
his Attorney.

UNITED STATES PATENT OFFICE.

WILLIAM BOSS, OF ST. PAUL, MINNESOTA.

CLOTHES-LINE REEL.

1,017,734. Specification of Letters Patent. Patented Feb. 20, 1912.

Application filed April 14, 1911. Serial No. 620,996.

*To all whom it may concern:*

Be it known that I, WILLIAM BOSS, a citizen of the United States, residing at St. Paul, in the county of Ramsey and State of Minnesota, have invented certain new and useful Improvements in Clothes-Line Reels, of which the following is a specification.

My invention relates to a reel to which a clothes-line may be attached and upon which the same may be readily wound or from which the clothes-line may be unwound with equal facility.

The object of my invention is to provide a simple, cheap and efficient device to be held in the hand and operated by hand for use in reeling and unreeling clothes-lines so that the said line may be placed in operative position and taken down with facility and despatch.

It is also an object of my invention to provide a reeling device having the above characteristics which may be conveniently used as a holder for surplus line not needed in any particular instance, and which may also be used as a device for tightening the line and holding the same tight after it has been strung.

The full objects and advantages of my invention will appear in connection with the detailed description thereof and are particularly pointed out in the claims.

In the drawings, illustrating the application of my invention in one form,—Figure 1 is a plan view, Fig. 2 a side view and Fig. 3 an end view of my device. Fig. 4 shows the reel with a length of clothes line wound thereon. Fig. 5 shows how the reel may be used to hold surplus line after the clothes line has been strung. Figs. 6 and 7 show the manner in which the reel may be used to tighten the line.

The body portion of the reel comprises a member 8 preferably of oblong flattened shape formed of wood or other material, as desired, and provided at one end with a reduced cylindrical portion 9 of relatively short extent. Angularly disposed in opposite directions in each end of the member 8, U-shaped holding arms 10 are provided, preferably formed of wire and secured within the body 8 upon the narrow sides thereof by being driven into drilled holes formed for that purpose, or in any other suitable manner. A spindle 11 is secured within the body member 8 extending through the cylindrical portion 9 in any suitable manner to hold said spindle non-rotatably within the body member 8. In the form shown, the spindle 11 is drawn into an extended wedged form, as shown in dotted line at 12 in Fig. 2, the member 8 and cylindrical portion 9 having a hole drilled longitudinally therein to permit the entrance of said spindle, the wedged shape end of which is forced into the material of the body member 8. However, any other means of assembling the spindle 11 within the body member 8 so as to prevent relative rotative movement thereof may be employed and falls within the scope of my invention. The spindle 11 is extended beyond the end of the tubular member 9 a sufficient distance to receive thereon a hand piece 13 which is freely rotatable upon said spindle and is of approximately the same diameter as the tubular portion 9. At a point beyond the outer end of the handle 13 the spindle is bent, as shown in Figs. 1 and 4, to form a crank handle 14. The spindle is additionally bent in a plane at right angles to the aforesaid crank bend, as shown at 15 in Figs. 2 and 3, for a purpose to be later described.

The clothes line 20 is secured to the reel in the first instance by passing the same successively in opposite directions through an end hole 16 and a center hole 17 formed transversely through the narrower dimension of the body member 8, the line being knotted outside of said body member, as clearly shown in Figs. 2 and 6.

In use, supposing hooks 21 and 22 to be secured to properly spaced posts or other supports from which the clothes-line is to be strung, the roll of line, as shown in Fig. 4, having at the free end thereof a loop 23 positioned over one of the arms 10 by means of which said line is held from unrolling, is carried out and the loop 23 placed upon one of the hooks 21. The operator then moves toward the hook 22, holding the reel by means of the handle 13 so as to permit the spindle 11 to rotate within said handle and the line to unreel, but controlling the rate of said unreeling by means of the cylindrical portion 9 held between the thumb and finger, or in most instances merely a slight pressure of a finger upon said member 9 will answer the purpose. When the hook 22 is reached the line 20 may be secured thereto by means of a loop of ordinary construction. If, as is frequently the case, there remains a considerable portion of the line upon the reel, a loop of the same may be drawn through one of the U-shaped members 10 and carried over the other of said members 10 at that end, as clearly shown in Fig. 5, holding the reel and the line thereon suspended without any possibility of said line unwinding. When it is desired to take up the line the same will be removed from the hook 22 and freed from the members 10, and the operator, by means of the handle 13 and crank extension 14 of the spindle 11, will rapidly re-reel the clothes-line removing the loop 23 from the hook 21 and securing the same in the position shown in Fig. 4, in which condition the line will be kept within the house where it will remain clean and protected from the destructive action of the elements until needed for further use.

In Figs. 6 and 7 is shown the manner of using my reel as a tightening device. In these figures the loop 23 is shown as attached to the hook 22 and the line as being completely unreeled so that the loop 24 extending between the holes 16 and 17 may be pulled out and passed over the hook 21. By means of the member 8, held at right angles to the line 20, said loop 24 may be caused to slide over the hook 21 and the line 20 thereby be tightened. After such tightening has been effected to the desired extent the apparatus will be placed in the position shown in Fig. 7 so that the bend 15 will come over the top of the lines forming the loop 24 which will cause a portion of the crank extension 14 to come beneath said lines thereby holding the line 20 locked in stretched condition.

The simplicity and utility of my device will be apparent. It can be manufactured cheaply and enables the clothes-line to be put up, taken down and stored with very little labor, thus avoiding the soiling and rapid destruction caused to clothes lines left permanently exposed out of doors. The feature of use as a tightening device will also obviate the necessity of using poles or other means for centrally supporting a clothes-line.

I claim:

1. A clothes-line reel comprising a body of relatively flat and narrow form, arms formed of wires both ends of which are seated in the narrower edges of said body to form closed loops extending angularly therefrom at each corner of said body, means secured to the body for rotating the same, and means on the rotating means for supporting the reel by the hand while the body is being rotated.

2. A clothes-line reel comprising a body of relatively flat and narrow form, arms extending angularly therefrom at each corner of said body, said body being provided with means for securing the line to said body with a loop of said line lying longitudinally of said body, means secured to the body for rotating the same, and means on the rotating means for supporting the reel by the hand while the body is being rotated.

3. A clothes-line reel comprising a body and arms thereon for holding the line, a spindle fast in said body provided with a crank handle, said body being provided with means for securing the line to said body with a loop of said line lying longitudinally of said body, and means on said crank handle whereby when said loop is drawn over a supporting member for the line and the line thereby is stretched said means will coöperate with the line to hold the same in stretched condition.

4. A clothes-line reel comprising a body and arms thereon for holding the line, a spindle fast in said body provided with a crank handle, said body being provided with a plurality of transverse holes for securing the line to the body with a loop of said line lying longitudinally of said body, said crank handle being formed with a bend to engage the line and hold the same in stretched condition when said loop has been drawn over a supporting member for the line and the line stretched by extending said loop.

5. A clothes-line reel comprising a body of relatively flat and narrow form having a reduced cylindrical portion at one end thereof, arms on the body for sustaining the outer coils of the line, a spindle fast in said body and extending centrally through said cylindrical portion, said spindle being formed with a crank handle at the free end thereof, the shank of said crank handle being provided with a line-engaging bend, and a hand piece rotatably mounted on the spindle between said cylindrical portion and crank handle.

In testimony whereof I affix my signature in presence of two witnesses.

WILLIAM BOSS.

Witnesses:
F. A. WHITELEY,
H. A. BOWMAN.